United States Patent
Redfern

(10) Patent No.: US 8,027,991 B2
(45) Date of Patent: Sep. 27, 2011

(54) ENHANCED SEARCHING USING A THESAURUS

(76) Inventor: Victoria Lesley Redfern, Canberra (AU)

(*) Notice: Subject to any disclaimer, the term of this patent is extended or adjusted under 35 U.S.C. 154(b) by 336 days.

(21) Appl. No.: 11/996,305

(22) PCT Filed: Jul. 26, 2006

(86) PCT No.: PCT/AU2006/001045
§ 371 (c)(1),
(2), (4) Date: Jan. 21, 2008

(87) PCT Pub. No.: WO2007/012120
PCT Pub. Date: Feb. 1, 2007

(65) Prior Publication Data
US 2008/0228741 A1    Sep. 18, 2008

(30) Foreign Application Priority Data
Jul. 26, 2005    (AU) .................................. 2005203250

(51) Int. Cl.
*G06F 7/00* (2006.01)
*G06F 17/30* (2006.01)
(52) U.S. Cl. ...................................................... 707/767
(58) Field of Classification Search .................. 707/767, 707/999.002, 999.003, 999.005
See application file for complete search history.

(56) References Cited

U.S. PATENT DOCUMENTS

| | | | |
|---|---|---|---|
| 2002/0069203 A1* | 6/2002 | Dar et al. | 707/10 |
| 2002/0152206 A1 | 10/2002 | Gusler et al. | |
| 2003/0014501 A1* | 1/2003 | Golding et al. | 709/218 |
| 2003/0200199 A1* | 10/2003 | Snyder | 707/2 |
| 2004/0030688 A1* | 2/2004 | Aridor et al. | 707/3 |
| 2004/0225640 A1* | 11/2004 | Brown et al. | 707/3 |
| 2005/0209992 A1 | 9/2005 | Kikinis et al. | |
| 2005/0283491 A1* | 12/2005 | Vandamme | 707/100 |
| 2007/0282826 A1* | 12/2007 | Hoeber et al. | 707/5 |
| 2008/0147644 A1* | 6/2008 | Aridor et al. | 707/5 |
| 2009/0106241 A1* | 4/2009 | Blackwell | 707/5 |
| 2009/0317786 A1* | 12/2009 | Alcorn et al. | 434/323 |

FOREIGN PATENT DOCUMENTS

EP    1160686 A2    12/2001

* cited by examiner

*Primary Examiner* — Mohammad Ali
*Assistant Examiner* — Patrick Darno
(74) *Attorney, Agent, or Firm* — David A. Guerra

(57) ABSTRACT

A method of providing enhanced on-line computer searching capabilities comprises: (a) forming a thesaurus database including first core concept terms and a series of secondary related terms; (b) providing a user interface to said database for selection of first core concept terms by a user; (c) carrying out a search for information relating to the core concept terms and to the secondary related terms; and (d) returning the results of the search to the user.

18 Claims, 6 Drawing Sheets

Subject List

Subject 1
Subject 2
⋮
Subject N

Fig. 5

| Primary Term ⤦30 | Secondary Term ⤦31 | First Semantic Term ⤦32 | Second Semantic Term ⤦33 |
|---|---|---|---|
| Airwave | Radio Wave | Radio Receiver | Wireless<br>Radio<br>Transistor<br>Trannie<br>Ghetto Blaster<br>Beat Box |
| Australian Quarantine Act | Quarantine Law Australia | Quarantine Imports<br>Illegal Smuggling | Illegal Australian Imports<br>Illegal Australian Exports |
| Olympic Games | Summer Olympic Games | Winter Olympic Games | Summer Olympic Sports<br>Winter Olympic Sports |
| I Have a Dream | Martin Luther King | Black Equality | Black Panther Movement<br>American Freedom |
| UN | United Nations | World Organizations | UNESCO<br>World Health Organization<br>World Bank |
| Thatcher Administration | British Government | UK Government | British Liberalism<br>Tory Party |
| Reffo | Refugee | Australian Immigration | Australian Asylum |

Fig. 6

| Primary Term | Secondary Term | First Semantic Term | Second Semantic Term |
|---|---|---|---|
| Citizen | Citizenship | National Citizen | Townsperson<br>Citizen Rights<br>National Population |

Fig. 7

| Primary Term | Secondary Term | First Semantic Term | Second Semantic Term |
|---|---|---|---|
| Policy Process | National Policy Process | Local Policy Process | Municipal Policy Process<br>Federal Policy Process |

Fig. 8

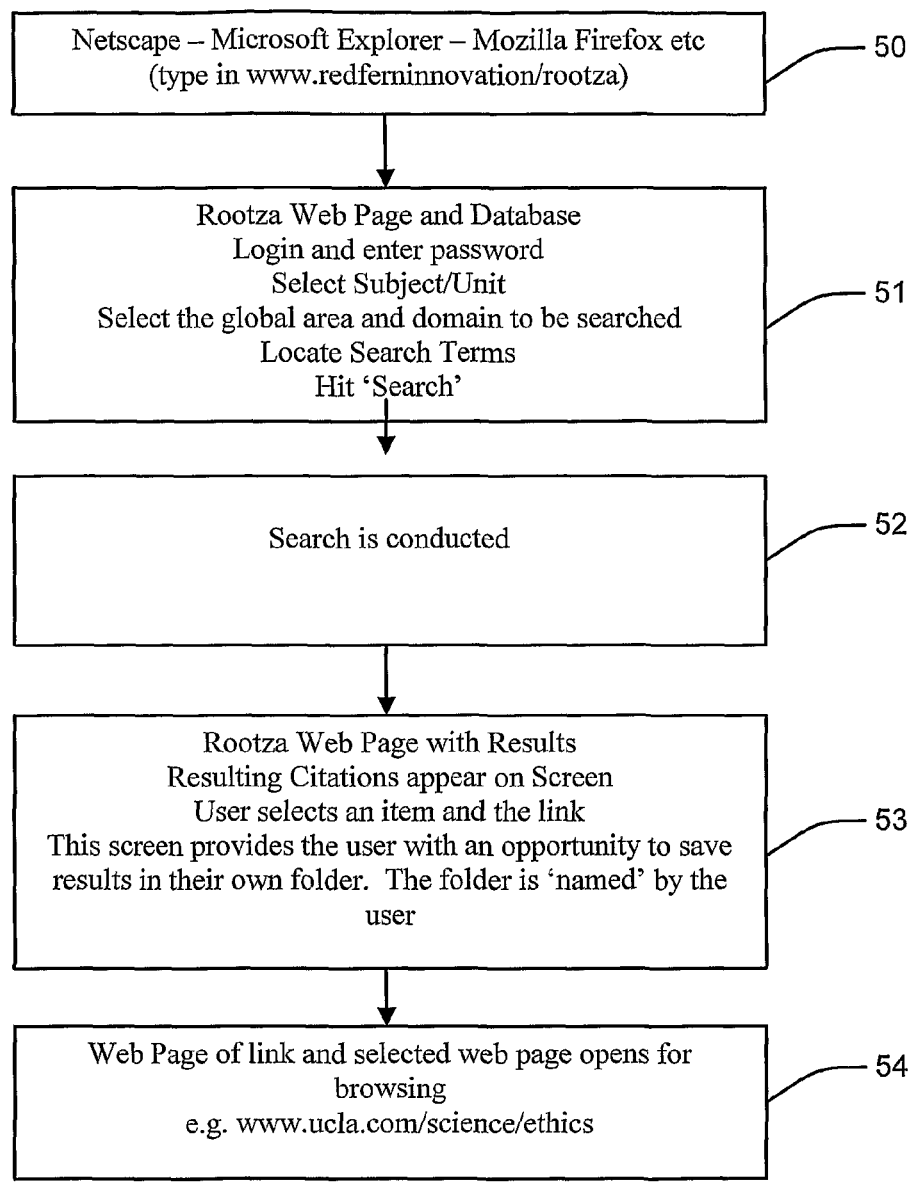
User May Use the Offered the Below Choices for Action
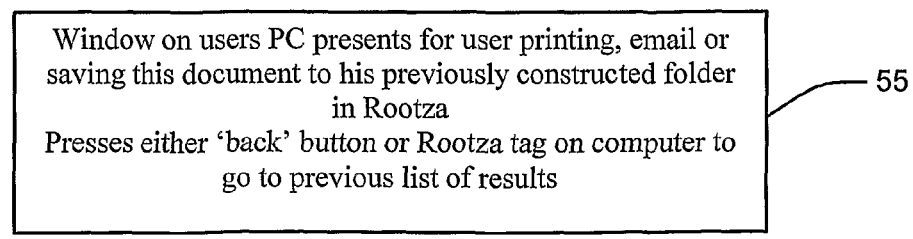
Fig. 10

ENHANCED SEARCHING USING A THESAURUS

CROSS-REFERENCE TO RELATED APPLICATIONS

This application is an U.S. national phase application under 35 U.S.C. §371 based upon co-pending International Application No. PCT/AU2006/001045 filed on Jul. 26, 2006. Additionally, this U.S. national phase application claims the benefit of priority of co-pending International Application No. PCT/AU2006/001045 filed on Jul. 26, 2006 and Australia Application No. 2005203250 filed on Jul. 26, 2005. The entire disclosures of the prior applications are incorporated herein by reference. The international application was published on Feb. 1, 2007 under Publication No. WO 2007/012120 A1.

FIELD OF THE INVENTION

The present invention relates to computer based searching systems, and, in particular, discloses a system for providing high quality search results.

BACKGROUND OF THE INVENTION

An 'information seeker/s' refers to any person of any age, gender, nationality or coming from any demographic group. These aforementioned persons are also those whom are conducting informal or formal research from home, school/college/university/company or any environment in which a computer operates. This also includes mainframe computers, mobile phones, personal digital assistants and any other device in which information may be sought.

There are novice and non-novice information-seekers and researchers who experience difficulties using databases, library catalogues, on-line journals and the internet because of the lack of recognition of appropriate search terms, various methods of interrogation and the lack of consistency in terminology on the internet, electronic databases and library online catalogues. This therefore creates an inefficient and time wasting experience.

A diagrammatic representation of how normal www/internet searching is carried out is shown in FIG. 1, wherein a user 1 uses a search engine such as Google 2 to search the whole of the web 3 using keywords or the like.

There are many concerns of undergraduates, postgraduates and academics when commencing academic research. Four major concerns are; efficiency of research methodologies, comprehensiveness of research materials available, the volume of research previously undertaken and the time involved in research using electronic media. When searching the internet the academic researcher, student or general public will encounter a lot of information that is related to commercial products or information that is either not correct or holds bias. Additionally, information seekers searching on the internet results in so many 'hits' they find it impossible to sort through the large amount of material that presents itself as well as trying to avoid commercial web sites of which are in the majority. However, the amount of valuable and up-to-date information on many government and non-government organizations, university, research institution and education websites is increasing and thereby provides additional information that is useful for the researcher or information seeker.

Increasingly, universities are enrolling many international students in their courses. In Australia international students make a large contribution to Australia's Gross National Product (GNP). Research shows that some of the key challenges for international students are: language, library systems and technology however, academic research provides substantial evidence that language is the primary challenge. International students whilst sometimes not having a firm grasp on English encounter difficulties in determining the core concepts of their subjects and there is the added complexity that academic literature is often written in the three dialects of English, American-English and Australian-English. Additionally, there is also the matter of idioms, colloquialisms and dialect which also compounds their comprehension problems. With the compounding factors of unsure English comprehension and language skills, international students tend to use information seeking tools such as Google® or some other freely available computer internet web site that is familiar or easy to use. However, they also experience the same difficulties as all information seekers, and that is their need to find information that suits their needs and to also find it quickly and easily.

Although using electronic media and the internet for research is often assumed to be efficient and easy, the breadth of information and the design of the interrogative technology found in many electronic search systems can become substantially complex. Therefore, in order to simplify the identification of search terms, the information seeker must be able to identify core concepts and develop a strategy to effectively retrieve information. For the experienced researcher this may not be difficult but for the novice researcher or international student, it can be quite onerous, fraught with materials that are inadequate or provide results that can divert the researcher from their required path.

The higher education sector expects students to have a modicum of experience (if not basic) of research skills before entering university. Accordingly, these skills are expected to be taught to students at high school or college level beforehand. However, it appears that there is a shortfall in students skill upon commencing university.

Related prior art uncovered during searches includes: US Patent Application Number US-2005/0065947-A1 (HE et.al.) 24 Mar. 2005, U.S. Pat. No. 6,523,001 (CHASE) 18 Feb. 2003, U.S Pat. No. 6,256,605 (MACMILLAN) 3 Jul. 2001, PCT Application Numbers WO-1999/034307 (INFO-DREAM CORPORATION) 8 Jul. 1999 and PCT/US98/27664, 28 Dec. 1998 (Andleigh et al.). each of which are discussed below.

Patent number US-2005/0065947 (HE et.al.) entitled 'Thesaurus Maintaining System and Method' is specifically a maintenance of thesaurus system that starts with a 'plurality of computers' and ends at a database. HE et al provides a different focus and application, directed to a thesaurus generation process. HE et al. is directed to the problem of databases not being able to find information because of misspellings.

U.S. Pat. No. 6,523,001 (Chase) entitled 'Interactive Connotative Thesaurus System is similar to other digital thesaurus programs such as the aforementioned patents. Chase discloses a thesaurus designed to associate positive or negative emotions and feelings to the connotative synonyms.

U.S. Pat. No. 6,256,605 (MacMillan) entitled 'System for and Method of Summarizing Etymological Information' is a computer system for summarizing English language etymological information that is in a database. The MacMillan citation uses only single words which the user may find in the database and that database provides etymological roots and origins of those words. The thesaucratic database consists of phrases, common sayings, dates and proper nouns and does not provide any other information. The MacMillan invention is not intended for www or internet searching, and does not provide any of the elements of the thesaucratic database nor provide any elements of a teaching or instructional nature. MacMillan is a reference tool that that retrieves synonyms from digital text materials and saves them into a database. The database will use those connotative synonyms in matching terms in other digital text materials in order to match both sets of terms.

Patent number WO 99/34307 8 Jul. 1999 (INFODREAM Corporation) entitled 'Extraction Server for Unstructured Documents'. This is a 'system for analyzing and extracting words and word groups from an electronic document and for storing those extracted words into a target database' that is later accessed in order to 'match' words in the stored and scanned documents.

None of the citations provide an online component or access the www and internet for searching, nor do they act as a teaching tool for all users, nor do they consist of core subject concepts, nor do they deliberately consist of contemporary natural language in the three dialects of English being English-English, Australian-English or American-English, nor do they provide help assistance with the basic principles of information seeking, or the requirements of academic referencing requirements, nor do they provide an opportunity for users to have a personalized folder to save bibliographic or url references, nor do they provide assistance with learning and instruction. Additionally, they also do not provide all this whilst being a tool to search on the internet with default domain restrictions whilst the system is customable to all users whether they be for personal, educational or corporate use.

Any discussion of the prior art throughout the specification should in no way be considered as an admission that such prior art is widely known or forms part of common general knowledge in the field.

SUMMARY OF THE INVENTION

It is an object of the present invention to provide an improved searching method and systems.

In accordance with a first aspect of the present invention, there is provided a method of providing enhanced on-line computer searching capabilities, the method comprising the steps of: (a) forming a thesaurus database including first core concept terms and a series of secondary related terms, related to the core concept terms; (b) providing a user interface to the database for selection of first core concept terms by a user; (c) upon selection of a core concept term by a user, carrying out a search for information relating to the core concept terms and of the secondary related terms; (d) providing the user with the results of the search.

The step (c) can involve searching over the internet and the search can be carried out for a predetermined subset of web domains selected by the user. The terms can include single or multiple words or dates. The thesaurus database preferably can include entries for different English dialects. The dialects can include English-English, American-English and Australian-English dialects. The dialects can include colloquialisms of English-English, American-English and Australian-English dialects. The dialects can include idioms of English-English, American-English and Australian-English dialects. The thesaurus database preferably can include acronyms of any language including English-English, American-English and Australian-English dialects. The thesaurus database preferably can include well known sayings of any language including English-English, American-English and Australian-English dialects. The domains can include the domains of education (.edu), government (.gov) and organizations (.org). The search can be carried out on the internet. The search can be carried out over domains in specific world geographic areas.

The method can also preferably include the step of: providing the user with Bibliographic or references to research materials associated with specific terms searched.

In accordance with a further aspect of the present invention, there is provided a system of providing enhanced on-line computer searching capabilities, the system including: a thesaurus database including first core concept terms and a series of secondary related terms, related to the core concept terms; a user interface to the database for selection of first core concept terms by a user; a search engine for, upon selection of a first core concept term, carrying out a search for information relating to the core concept terms and of the secondary related terms;

The system can be accessed using a personal computer, laptop computer, local area network computer, personal digital assistant, remote server or other digital device.

BRIEF DESCRIPTION OF THE DRAWINGS

A preferred embodiment of the invention will now be described, by way of example only, with reference to the accompanying drawings in which:

FIG. 5 illustrates an initial subject listing provided to a user;

FIG. 6 illustrates the table maintained within the Semantic Thesaurus, illustrating the different concepts of words and phrases of terms;

FIG. 7 illustrates an example entry of conceptually distanced terms;

FIG. 8 illustrates the descending/ascending order of terms;

FIG. 10 illustrates an overview of user operation of the web interface

DESCRIPTION OF PREFERRED AND OTHER EMBODIMENTS

The preferred embodiments of the present invention provide an Online Contemporary and Natural Language Core Concept Subject Specific Semantic Thesaurus as an educational tool that not only provides training in recognition of core concept research terms, information seeking and the use of research tools, but also provides a solution that promotes independence and autonomy when undertaking research or information seeking.

Figure 1:
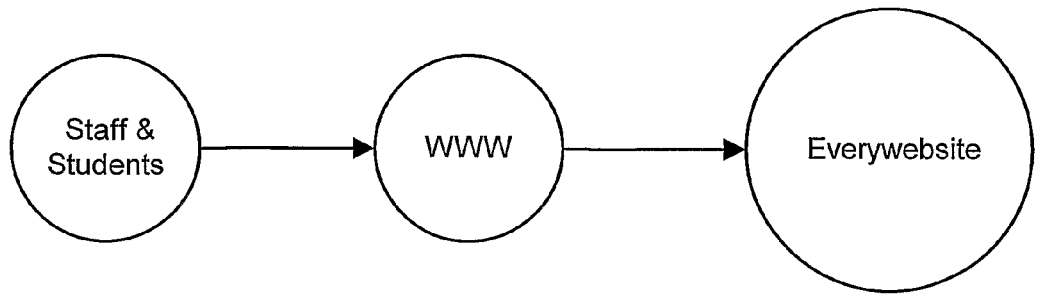
FIG. 1 illustrates prior art methods used for internet searching.
Figure 2:
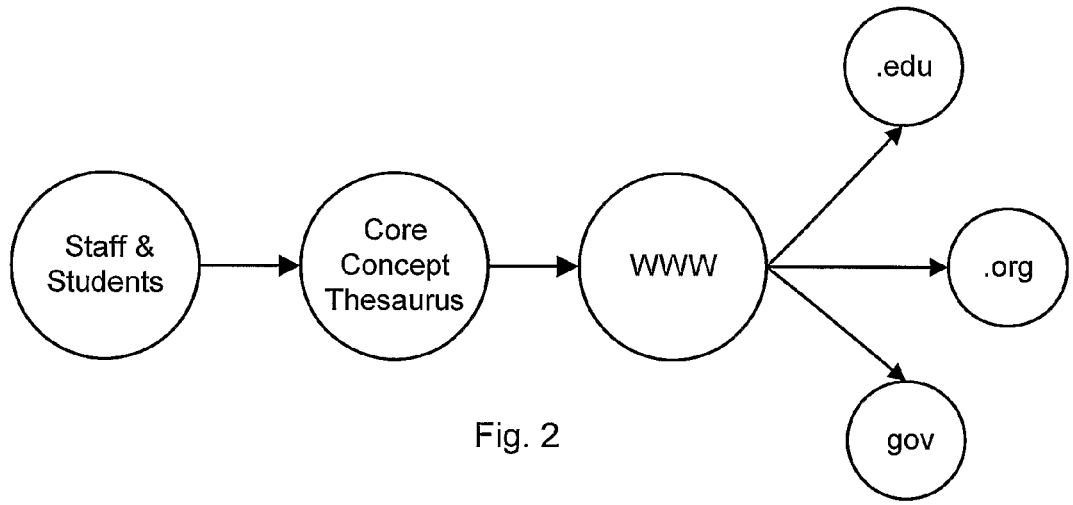
FIG. 2 illustrates the process of the preferred embodiment for internet searching of particular website domains.

In the preferred embodiments, as illustrated in FIG. 2, the staff or student 10 conducts a thesaucaratic search by interacting with a Thesaurus 11 to define a collection of keywords. These keywords are then used to selectively search the web 12 with domains having particular domain core elements names only. The preferred embodiment is directed to providing students in higher education, and other forms of education as well as the general public who perform information seeking, to undertake research on the internet and thereby provide research methodologies that are time efficient and produce resource rich results. The online thesaucratic database and web interface enables information seekers to search for information on the www and internet.

Figure 3:
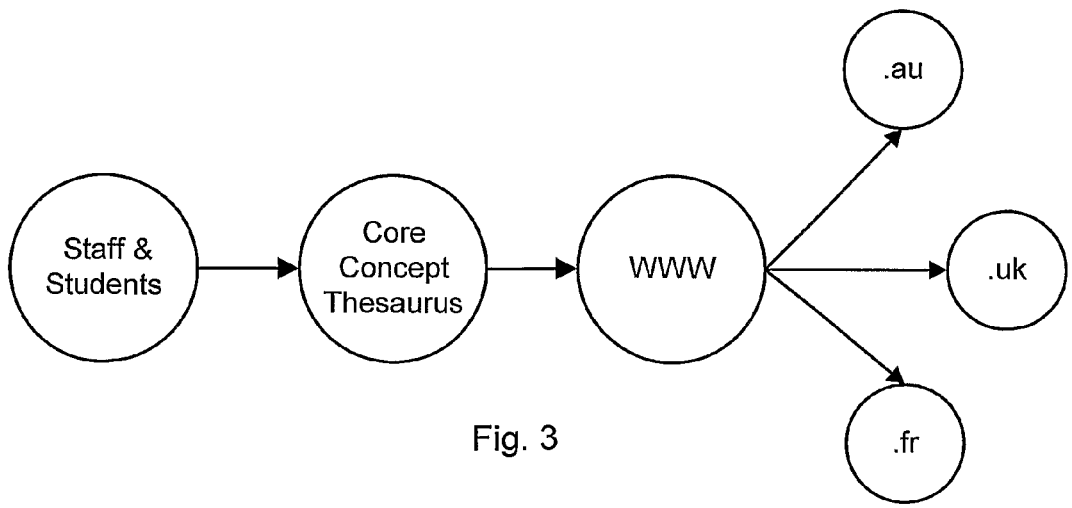
FIG. 3 illustrates the process of the preferred embodiment for internet searching of particular website geographic domains.

In the alternative, instead of specific domains, particular geographic domains can be searched. This process is illustrated further in FIG. 3.

Preferably, the thesaucratic database is fully able to accommodate the variations of the English language being English-English, Australian-English nor American English.

The search terms are provided in three dialects of English whilst also including vernacular, colloquialisms, dates sayings etc additionally that the online core concept database does not only consist of single words but also concepts, and phrases in both contemporary and natural language and the synonymatic connections are not necessarily directly related to the meaning of the synonym it is connected to, the online core concept thesaucratic database.

The preferred embodiment is not designed to provide any information on the meaning of the terms in its database nor does it place any meaning on a terms association with another loosely semantic connective term in its database. The provision of the terms is to provide a means of providing terms to the user so those terms may be used to search the www or internet.

The preferred embodiment process of using the thesaucratic database and web interface is driven by the defined composite of three elements or tools of achieving successful outcomes for information seekers.

Figure 4:
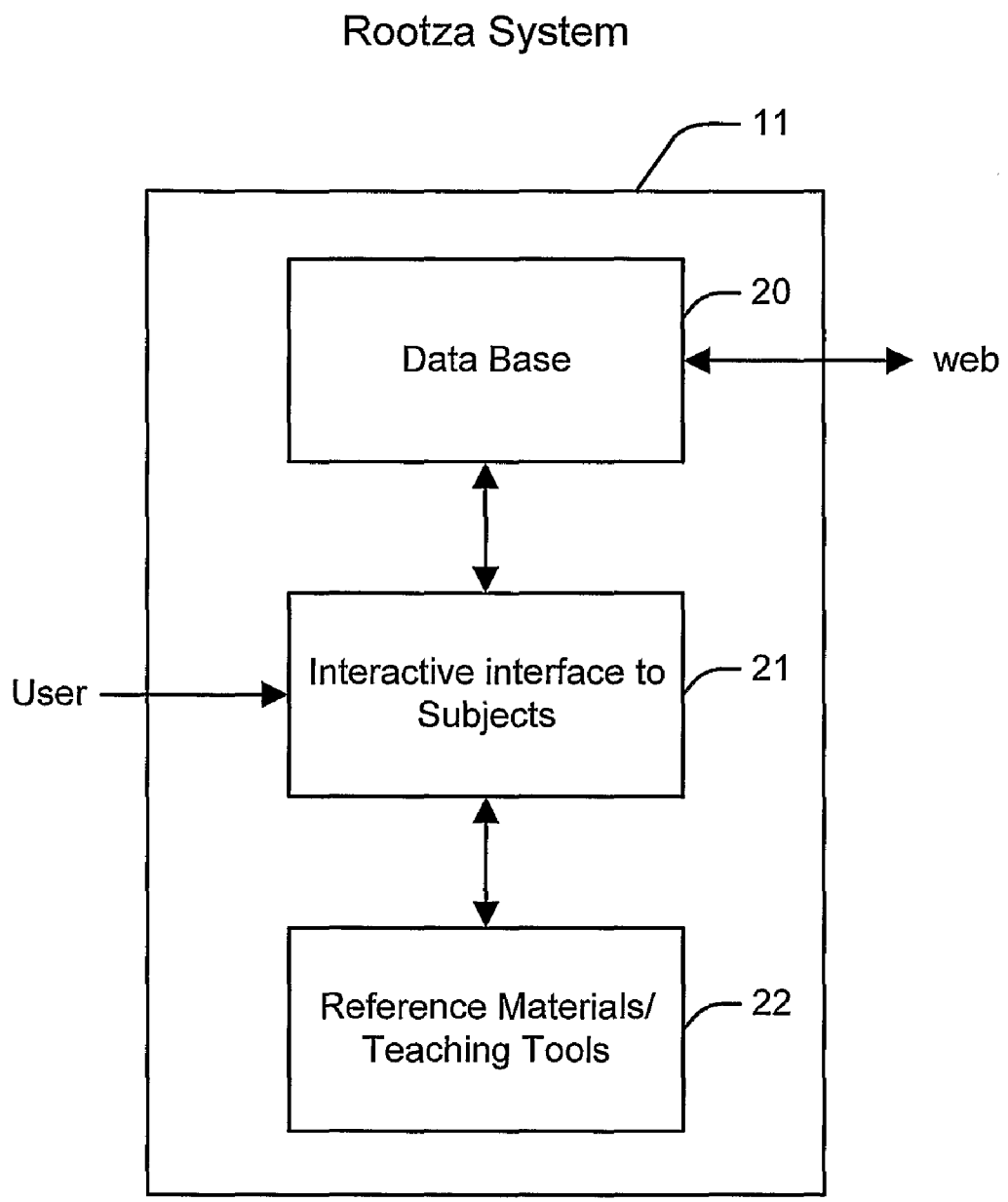
FIG. 4 illustrates the main components of the preferred embodiment.
Figure 9:
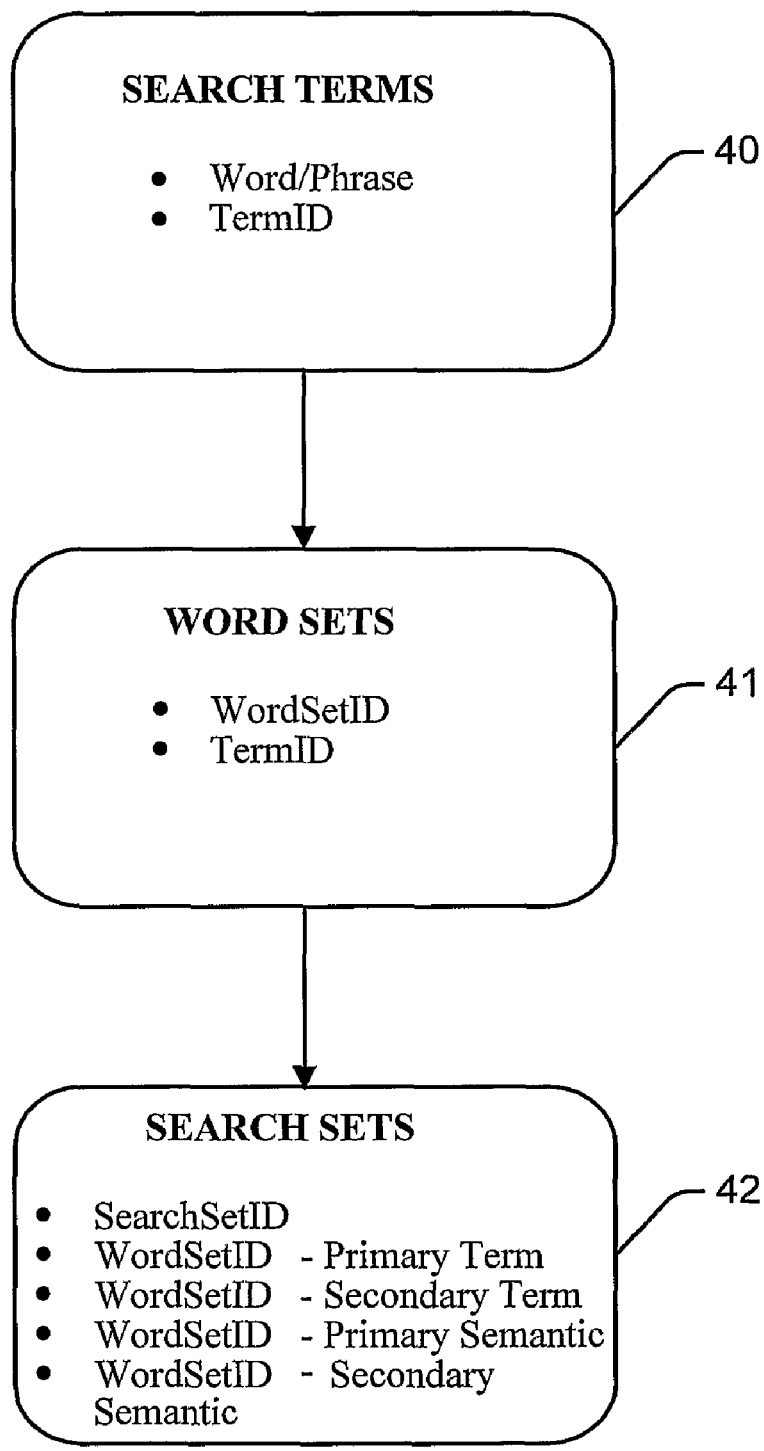
FIG. 9 illustrates the organization of Search Terms and Synonym Sets within the Database.

As Illustrated in FIG. 4 the Preferred Embodiment Uses Three Main Elements.

The first element is the thesaucratic database 20 which consists of four subcomponents. There are: four classes of terms (primary, secondary, third and fourth) in descending order of distance from the primary term, the different than normal form of database ontological structure that is in dialects of the English language, colloquialisms in the vernacular and also phrases, sayings, dates and proper nouns and there is also a list of urls which the search engines searches or 'trawls' the www and internet.

The second element is the teaching tool or reference materials 22 of which there are three sub components which are: speech bubbles, banners, 'pop-ups' that teach and/or instruct various methods of information seeking.

The third element is an overall interactive search tool web interface 21 for the www and internet. The three elements may be used in conjunction with each other or alone.

The thesaucratic database and web interface was specifically designed and customizable for any unit or subject for universities, colleges, high schools, primary or elementary schools, businesses, corporations, government departments, organizations and any educational organization, it was also designed to be used by any information or knowledge management area and home users who have access to a computer.

There are many concerns of the general public, undergraduates, postgraduates and academics when commencing research. Four major concerns are; efficiency of research methodologies, comprehensiveness of research materials available, the volume of research previously undertaken and the time involved in research using electronic media.

In order to be efficient and produce comprehensive results researchers must rid themselves of barriers in information seeking. Holistically, on the world perspective, in developed and developing nations, society information seeking plays a crucial part in economic, social and political life. Additionally, unless efficiencies and research tools for information seeking within the education sector are improved, conducting research utilizing electronic media such as the internet, library databases and on-line journals will continue to be inefficient. Therefore, it follows that information seeking and the efficiency in this task is important in a fast paced modern world. When searching the internet, the information seeker will encounter a lot that is trivial and bizarre. However, the amount of valuable and up-to-date information on many government and non-government organizations and research institution websites is increasing and thereby provides additional information that is useful for the researcher. This success and exponential growth of the www makes it difficult to find and access and to maintain information of use to a variety of users' and unfortunately, information seekers encounter difficulties such as the superficiality and inconsistency of web site information.

That academic research has concluded that information seekers prefer the www and the amount of time spent using the www is not indicative that the results gained are quality information because there appears to be little indication of the subjective peer review process that is appropriate for academic purposes. Accordingly, is the need for efficient and effective information seeking tools to assist information seekers to avoid the 'trivial and bizarre'.

Increasingly, universities and other educational institutions are enrolling many international students in their courses and these international students make a large contribution to national gross domestic product (GDP). Naturally, it is within universities and educational institutions best interests for international students to be academically successful. Therefore, universities and educational institutions need to make a concerted effort to assist students who lack language or academic skills and this is also the same situation with domestic students and users who are on the path to self education and lifelong learning.

Contemporary natural language thesauri and semantic webbing are two recent research technologies undergoing development. Contemporary natural language thesauri are based on common accepted speech vocabularies. Semantic webbing relationships that are built into search engines interrogates on terms semantically linked to materials on the www as well as databases and other electronically authored available resources. Although programming semantic web protocols into the online contemporary thesaucratic database may prove helpful, in this particular case, because the core concepts in the database are diverse, the need for close semantic relations are not absolutely necessary as the thesaurus is a database constructed with similar and related terms instead of alternate terms, and will be a tool produced that will search electronic resources comprehensively and produce materials that are more targeted to researchers needs. It has been postulated that if the www can be decentralized and of greater simplicity then the tools to aid information seekers will also be developed with the same paradigm, hence the thesaucratic contemporary language core concept database and internet search tool.

The extent of computerized materials within the education framework and the importance of rapidly changing technologies in academic institutions has been undergoing rapid growth as has the usage of CD ROMS, databases, software, on-line teaching materials and student course materials used in city, regional and country universities and, long distance education providers.

Some research findings are that academics feel that databases, although they provide benefits, the potential value of database materials are being over-rated. These same academics also believed that many databases were useless for a varying number of reasons. Some of these reasons were:

database holdings are based on a program developer's opinion of what was valuable, submitting material to a Law database was too difficult, databases can be difficult to use, they lack time to use databases, there was a lack of customizability and lastly, the amount of material with unclear abstracts on databases was daunting.

Language, speech and terminology are constantly evolving. Database thesauri, research descriptors and Library of Congress classifications are constantly added, altered and deleted according to language and vocabulary in common use. The research methodology of defining the research question, establishing search terms, definitions and descriptors and using these terms for interrogating a library catalogue, electronic databases, online journals and the internet is complicated by the differences in thesauri, truncation, Boolean operators and wildcards as well as subject headings. Therefore, to research one topic, researchers have to try different thesaurus terms and keywords according to the design of the database, library catalogue or internet search engine. Consequently, because of the differences between library subject headings, database and search engine designs, search terms, keywords and interrogation methodologies, results are not necessarily consistent and different results will be produced. Therefore, information seekers or researchers, as a part of their research methodology whilst developing their search terms, have to adapt their strategies according to the different electronic medium used. Some databases are searched by keywords such as 'policy', search terms such as 'policy analysis', or free-text which means the database searched seeks documents where terms such as 'policy' or 'policy analysis' occur. Some databases have inbuilt classification lists of terms such as the Library of Congress Classifications, some have a thesaurus and some have nothing to refer to for help with search terms. Although some databases are similar, some search terms may be evident in one database or catalogue but omitted in others and also, search terms are regularly changed, adapted or deleted. Some variations between the Library of Congress subject headings and the Academic Search Elite database is evidenced by the following: the terms 'flight delay', 'day dreaming', 'debt management', 'fire back-drafts', 'flexible workplace practices', 'SARS' and 'SMS' are not listed in the Library of Congress subject headings. However, in Academic Search Elite it is indicated that for the terms 'flight delay' 'see easements', 'day dreaming' 'use fantasy', for 'SMS' 'use test messages'. 'Debt management' and 'SARS' is listed but 'fire back-drafts' and 'flexible workplace practices' are not listed although all these terms are in common use. Additionally, because of the different designs of databases etcetera, the functionality is not always the same and this therefore, is a handicap to researchers.

Information seeking on the www is different to databases because much information can be found by using any random word or phrase but unfortunately, the results may be so large that finding information that is academically relevant to researcher needs is difficult. This difficulty is compounded because the large number of commercial and personal 'hobby' websites can make it difficult to locate academically sound and refereed materials as well as produce results that are accurate and valid.

By using programming that represents the semantics of documents within web applications, the future may provide a means of intelligent research that will closely parallel the 'natural language' research processes of humans. The development of a core concept subject specific contemporary natural language thesauratic database to interrogate the www will enable the production of comprehensive academic results and therefore promote efficiency and enhance academic excellence and provide assistance for international, domestic and all information seekers. Additionally, that the thesaucratic database has a major component that enhances information literacy this will also add an element that international students and others will benefit.

Contemporary language is language in common use. It can consist of colloquialisms, slang, phrases and deliberately devised expressions, jingoistic terminology and acronyms and these are regularly brought into usage. Two examples are 'flight delay' and 'SMS' that are modern day expressions that do not exist in the Library of Congress Classifications and a number of databases because of their informal concept they are seemingly not a part of formal English language. Noah Webster in 1828 compiled 'The Little Green Book' which was the first American dictionary. Webster listed current words being used in the colonies, made spelling alterations such as 'z' instead of 's' in such words as 'colonized' and 'Americanized' and also deleted double letter spelling from such words such as counseling and spelling alterations such as 'gaol' to 'jail'. Webster also invented new words to separate Anglo English and American English in order to develop a new contemporary language and culturally separate America from England in the formative years of the American nation. In the 1960s the Australian Macquarie Dictionary was published and was specifically developed to represent and recognise Australian contemporary language. However, although it represents the contemporary language of Australia, it is still a dictionary of natural language whereas the Webster's dictionary of language was contemporary of it's time and deliberately contrived as many words were deliberately devised and some spellings altered. Although the Webster Dictionary and the Australian Macquarie Dictionary represent both societies and their contemporary language, even though they are 200 years and 5000 miles apart, they are two examples of differences in the English language that can create difficulties for students undertaking information seeking and this is one of the foci that the research, experiment and the development of the core concept thesaucratic database addresses.

Semantic web technology is an attempt to rectify knowledge management problems such as irrelevancy of materials retrieved with keywords that are not being recognised within a context, and the need for human interaction to manually evaluate, weed and consolidate retrieved materials into a semblance of order that fit information seeker requirements. The first aspect of semantic language is that semantics are needed to automate processing of the content of web pages as well as the provision of standardized vocabulary that refers to 'real-world' semantics to enable both computers and humans to share information and knowledge. The core concept subject specific contemporary language thesauratic database supports this thinking because it has been developed using formal core concept terms that are semantically linked.

The major language elements on the path to a semantic web are: hypertext markup language (HTML), resource description framework (RDF) to Ontology Web Language (OWL). Web pages were originally designed using (HTML) however using the HTML language means that the internet could only search for documents by using single word searching. Although a phrase such as 'asynchronous switching' may be typed in the 'search' field, the search will be conduced using the words as single entities. Further development of computer language provided the resource description framework (RDF) language. RDF provided the capacity for phrase searching. An example again is the phrase 'asynchronous switching' which is treated as a phrase instead of single words. OWL was developed to be compatible with the world wide web (www) and semantic web (W3.org 2005). RDF and OWL are semantic web language standards that provide a way of managing assets for integration and sharing of data on the www.

Previously the simplicity of the HTML and similar languages such as the Unicode language of the 1980s has prevented the growth of semantic searching because of the need for a more complex ontology that was not possible under HTML. The development from HTML to RDF is today extended to the ontological language of OWL as it suits the three requirements of being intuitive for the user, have well defined semantic relationships and links to the older languages such as XML, HTML and RDF in order to be able to source and read data written in these language.

Because of the informal and unregimented way the www developed, national and international regulations have not been able to be organized fast enough in order to promote consistency and regimentation. Therefore, web pages and materials developed for the www by the developers or authors did not and in some cases today, have not completed forms for inclusion and/or connection to other web sites and accordingly, links are not normally/regularly completed. This follows that if other web editors are not advised of web pages availability then the information on those web sites are not easily found and may be invisible to information seekers even though the information exists.

This problem is compounded by the way search engines search as the limits of their searching is curtailed by the fact that search engines have to be previously advised where to search for information. By web editors/authors not completing the forms to enable their web sites to be included with links this thereby means those non-associated web pages are not easily found by information seekers.

The aim of HTML was to simplify the web whilst providing a degree of consistency in web documents and to ensure web documents programmed in HTML would display substantially identically on any computer regardless of the program operating the information seekers computer or computer programs. Following HTML came Hypertext Transfer protocol (HTTP). HTTP is the set of rules that computers use to communicate over the internet and allow hypertext links to automatically retrieve documents on the web. In other words, documents are written in HTML and HTTP is used to recover those documents. Then came the Universal Resource Locator (URL) in order to standardize a unique address on the internet an example is www.redferninnovation.com.

It appears that many novice information seekers believe that web search tools used for searching for information on the www can find all information on the www that is related to the typed in query. However, this belief is erroneous as there is a difference between search engines, search directories and crawlers and how they operate. Most search engines are not designed for academic research because they are not specific enough as search engines are not cognitive and will only search for information based on typed in terms. Because of the uncontrolled nature of the internet information seekers find that they are using different techniques to gather information on the internet than they do using the more traditional library databases and catalogues. An example of the different techniques are that for the internet the information seekers tend to browse using directories and follow links, whereas using the traditional library and databases, the information seekers type in terms they think might produce some relative information.

Information seeking or web searching is a deliberate behavior as the information seeker is looking for specific materials by constructing search terms in a search engine whereas browsing is less structured. Browsing is the process of accessing directories and following those links in web sites or web pages or alternately, a search is turned into browsing technique by typing a search term in a search engine (searching) and then the process of following the links provided via the results produced in that search is browsing.

Information seekers who are advantaged with the knowledge and skills effectively use the www and associated resources successfully to solve information problems. Those information seekers who have additional background-knowledge related to the topic area of a specific web search are even further advantaged. Whereas the inexperienced user is the opposite and has little skills or knowledge of the internet and the www and finds difficulty in finding information.

Whether information seekers are searching the www, library catalogues or electronic databases there are basic components within the search environment that can make the search successful. It is this researcher's opinion that although the 'experienced user' needs less help in information seeking as they have the knowledge and skills, and the inexperienced user has less skill in information seeking, it appears that both categories of user would be advantaged by having a strong 'background knowledge' of the topic being researched. However, if the 'background knowledge' is lacking then a core concept subject specific thesaucratic database may assist these users. To use the www and search engines effectively requires a variety of skills but additionally, that browsing through an information tree, cognitive capacity to organise a search and an ability to execute the search is imperative.

The established basic components of searching a database are: goal, intention, psychological variables, physical state of the system, physical variables of the system and, mechanisms of the system. The goal is to arrive at a specific destination (locate appropriate materials), the intention is to satisfy the goal by using the database and internet tools to search effectively, psychological variables are the way the cognitive processes work to undertake the search, the physical state of the system is to use the most appropriate databases, the physical variables of the system are the design difference of internet sites and databases and, the mechanisms that control the variables are the internet linkages and the internet service provider (ISP). Once the former has been performed, the stages of: establishing the goal, forming the intention, specifying the action sequence, executing the action, perceiving the action state, interpreting the state and, evaluating the system state with respect to the goals and intentions leads to a productive or satisfactory search.

Because information seekers are unclear when establishing search terms when using electronic databases, library catalogues and digital media, users prefer to search on the www using a proprietary search tools. Three aims have been identified preceding the development of a www tool to address these issues. The first aim was to provide an online tool to aid and teach student information seeking skills, the second aim is to provide a subject based tool for searching on the www the third is to develop a teaching tool for subject core concepts.

The research aim was to develop the thesaucratic database and implement the concept subject specific contemporary language thesaucratic database, with an information seeking teaching tool component, that will search the www for academic literature within an educational context which will assist students and other users in learning information seeking techniques, identification of core concepts and provide more concentrated results whist searching on the www. Therefore, this tool was substantively developed as an online research learning tool to the education community and the general public whilst adding knowledge to information literacy in the area of information seeking.

The core concept subject specific thesaucratic database is a tool which will not only teach students the basic principles of information seeking and enhance their knowledge of subject concepts but also help overcome the difficulty students experience using databases, library catalogues, on-line journals and the internet because of the lack of consistency in terminology, recognition of appropriate search terms and various methods of interrogation.

Brief Summation Of Benefits

The key benefits of the preferred embodiment include: provides subject or topic concept terms, searches on the world wide web (www), curbs use of commercial web sites in search results, conducts www online searches in specific geographic global areas, provides concentrated qualified results, teaches information seeking skills and strategies, aids information literacy, customisable by the user, provides folders for storage of bibliographic records and is suitable for all www users.

Additional Commercial And Technical Advantages Of The Invention

Because of the simple design of the invention, it is not only a tool to be used on the internet. It can also be used on an intranet or on a stand alone computer. Some examples are:

Commercial aircraft: whilst in a flight simulator or in a 'real flight' situation whereby a light or dial indicates a problem, instead of the flight engineer consulting a book, first looking up the problem, then solving it using the book, the preferred embodiment can be consulted. This can be done via the provided search terms, the engineer would locate the search terms and select whatever is appropriate for the situation and the computer would produce text on the screen advising what the next action should be or asking the engineer for additional information until the computer has located the problem and given the engineer and/or pilot the solution.

Emergence Calls to Police, Ambulance, Fire Brigade etc: the Emergency Operator speaking to the caller could identify the search term, the path followed for a successful solving of an emergency and action as quickly as possible.

Call Center Operation: the call centre operator could analyse the callers request or problem and follow the same process, that is, locate the term that is applicable to the problem, the program finds it on the computer . . . then asking another question of the call centre operator (for the caller) and the caller's problem would be rectified due to the pre-programmed instructions.

Social Situations: The preferred embodiment can also be adapted and used to teach children and others about 'stranger danger' and how to handle online and public situations with predatory persons and others who target children and teenagers. Additionally, it can be used to teach children or adults how to handle a dangerous or threatening situation such as violence, abuse or fire, floods or storms.

In the case of Aircraft, Emergency Facilities, Call Centres etc potential problems driven by human error could be eliminated by using the preferred embodiment program. Whilst at the same time, because of the bubbles, banners, and drop down boxes it is providing teaching/training to users on the task of information seeking and problem solving.

This same commercial application will also be possible in the areas where there are call centres or an internal corporate need to find information within company or organizational knowledge management systems as well as providing education for staff in information literacy. It may also be used in industrial settings as well.

Naturally, there are many commercial applications not mentioned above as the thesaucratic database and web tool will fit and can be adapted and programmed to fit almost any scenario whether is it is in the public, corporate or private areas.

Lastly, that the preferred embodiment is a digital tool originally developed for educational purposes it may also be used for teaching for specific subject that are taught online.

The preferred embodiment is economical to run, search terms and instructions need little updating. Additionally, it may be programmed with terms in any language. It also will provide the ability to search in particular geographic areas of the world. They include: The Americas, Europe, Asia, Middle East and Africa, Australia and the Pacific.

The online contemporary and natural language core concept subject specific thesaucratic database 11 is an information seeking tool that is loaded on a computer server or a personal computer and accessed directly or remotely by users 10 via a local area computer network or remote server and semantically searches for information on the internet 12 using a standard commercially available browser. The thesaurus can operate on a personal computer, laptop computer, local area network computer or remote server computer or personal digital assistant or any other digital instrument from which the information seeker accesses the thesaurus program via any search engine or web page.

The thesaurus 11 is based on education subjects and is constructed using the dialects of English-English, American-English, Australian-English and contemporary natural language, acronyms, sayings, and terms of speech that are in everyday use.

The online contemporary and natural language core concept subject specific semantic thesaurus 11 is designed as an educational search tool for the internet and, as illustrated in FIG. 4, includes three sub-components.

The first component 20 is the database, the second is the interactive subject screen 21 through which a user interacts, and the third is bibliographic and/or reference materials 22. As discussed hereinafter, the database 20 contains the core concepts (primary terms), secondary terms, primary semantic terms and secondary semantic terms.

Figure 5:
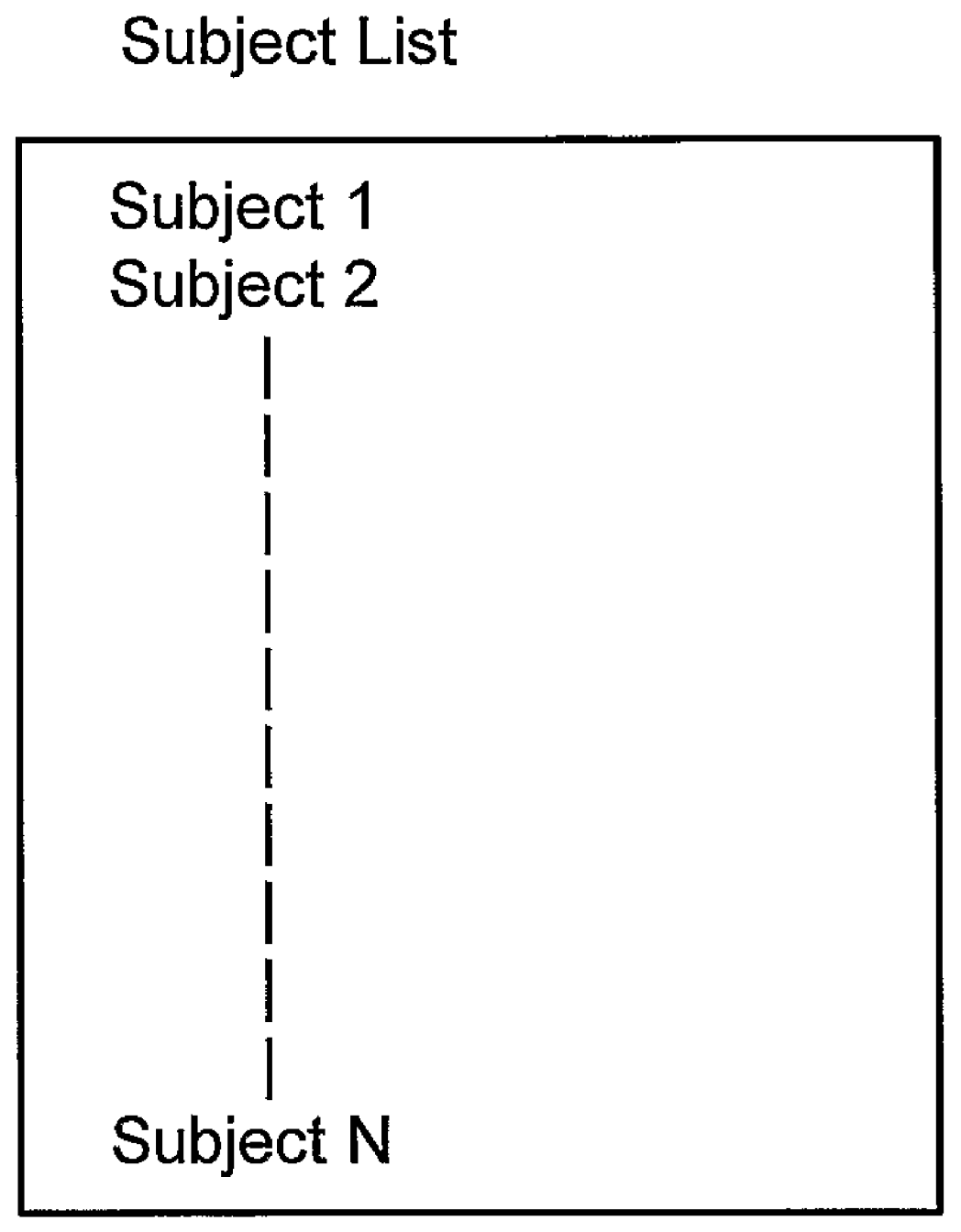

The initial interactive subject selection screen comprises of a list of subjects (as listed in FIG. 5) from which the user may select a subject by the use of a relevant pointing device. Connected to the initial subject selection screen is the subject data screen. The subject data screen is where the information seeker commences their internet search.

The thesaurus database consists of core concepts from academic research materials, thesauri and dictionaries. The subject core concepts and terms compiled on the database consist of alternative, identical or similar terms and forms of terms such as: names of significant events, organizations, people, places, dates, sayings, acronyms, phrases of speech, events, names of legislation and acronyms. An example of these is shown in FIG. 6. The ontological structure of the subject specific concept thesaucratic database operates using controlled vocabulary. Semantically, the thesaurus will firstly search for the primary term 30, secondly, the secondary term 31, thirdly, first semantic terms 32 and fourthly, the second semantic terms 33. A 'term' may be both a single word or a phrase as indicated in FIG. 6. There is only one core concept term in the primary term field 30, one core concept term in the secondary term field 31, a number of primary semantic terms 32 in the first semantic term field and a number of secondary semantic terms in the second semantic term field 33. All of these terms are linked and are searched in descending order.

The terms that are most distanced from the core concept primary term and the last term listed in the second semantic term fields are the most conceptually distanced. An example is shown in FIG. 7.

All terms are related to other terms in the primary term selected because of the hidden mapping. An example is shown in FIG. 8 wherein the subject selected may be for the primary core concept term 'policy process' and the database will search for 'policy process', 'local policy process', 'municipal policy process', 'national policy process' and 'federal policy process' in the descending order. The thesaurus also search for associated suffixes, prefixes, single and plural terms.

The database 20 is designed to semantically search the internet in term order as a meta search and is programmed by default to search for .edu, .org and .gov domains in the English language. However, there is provision for the information seeker to change this default to include .com or another domain extension as required as well as providing the opportunity to select a country domain for the extension such as, .fr, .nz, .au, .uk. and/or others.

The thesaucratic database and associated search tool also allows for users to designate specific world geographic areas in which they would like the search to be conducted. These geographic areas can include: Americas, Europe, Asia, Middle East and Africa, Australia and the Pacific.

Prototype Implementation

A prototype implementation of the preferred embodiment has been constructed under the name "Rootza". The basic infrastructure is built entirely using PHP 5 and MySQL 5, which are both enterprise-level open-source products.

The Rootza system is based on a 3-tier architecture, and the primary components are:

$1^{st}$ Tier: a MySQL database for holding the search terms and synonym sets of FIG. 6

$2^{nd}$ Tier: PHP scripts to access and manipulate the data within the database $3^{rd}$ Tier: Web pages designed in HTML, PHP and JavaScript to provide a front-end user interface Each of these components is explained in further detail below, including the details of their interactions with one another:

$1^{st}$ Tier: The MySQL Database

The $1^{st}$ Tier is the level of the system architecture where the raw data is stored. The search terms and synonym sets such as those illustrated in FIG. 6 and used by Rootza are broken down into their simplest sub-components and stored within the database in such a way as to minimise repetition of data, and the possibility for errors during data entry.

When a user searches for a particular term using Rootza, they are presented with a set of related search terms, and the user is given the option of conducting the search or using any of those terms, depending on how broad or narrow a search they require. In order to efficiently store the data needed to power such a system, the synonym sets were first broken down into individual search terms, and each term was given a unique, automatically generated identification number. This identification number was then used to link the search terms into sets of words with same/similar meanings, and these word sets were in turn linked to create the synonym sets that would be seen and used by visitors to the site.

One structure of the database is shown diagrammatically as follows in FIG. 6 with each search term (FIG. 5) being provided with a unique ID, the terms having corresponding word sets 41, and a corresponding separate database of search sets 42.

$2^{nd}$ Tier: The PHP Scripts

The scripts to access and manipulate the database have been created using PHP 5. PHP 5 extensively supports the Object-Oriented Programming (OOP) paradigm, whereby programs are written to represent real-word objects, as opposed to merely being collections of functions and variables. The Rootza system utilises OOP to represent and access search terms, word sets and search sets. This approach offers the following advantages:

1. Since the code for each object is written and stored separately, it is easy to add or modify new information and functions without affecting the existing operation of the system.
2. The objects can in turn be linked to one another, making it possible to reuse blocks of code within the system—future corrections/modifications would thus only need to be made in one part of the code, and all related parts would be automatically corrected/modified as well.
3. The portion of the code that interacts with the database has been created as an entirely independent module (known as a Database Interface), which in turn is 'plugged in' to the rest of the code. This means that in the future, if the MySQL database needs to be upgraded, any technical changes will only need to be made within the Database Interface, and the rest of the system will remain entirely unaffected.

$3^{rd}$ Tier: The User Interface

The front-end of the Rootza system, i.e. the User Interface, consists of a collection of web pages which accept the users' input through HTML forms and pass this input data to the PHP scripts, which in turn interact with the database and return the search results. These search results are then processed by the PHP scripts and displayed in HTML format by the User Interface.

The pages can be created in HTML 4.0 and the formatting is applied via external formatting files, known as Cascading Style Sheets. This method allows the separation of content from design within the web pages; this means that designs can be modified or even completely switched by simply applying different style sheets. This technique can be used to present the same basic system through different user interfaces that are specifically tailored to match the needs and preferences of various user groups.

Query Language

The front end interface preferably allows for some Boolean operations to be carried out on the data. These queries can be formed from arbitrary Boolean expressions containing the keywords AND, OR, and NOT, and grouped with parentheses. For example:

information retrieval
finds documents containing 'information' or 'retrieval'
information or retrieval
same as above
information and retrieval
finds documents containing both 'information' and 'retrieval'
information not retrieval
finds documents containing 'information' but not 'retrieval'
(information not retrieval) and WAIS finds documents containing 'WAIS', plus 'information' but not 'retrieval' web* finds documents containing words starting with 'web'

The steps of user operation of the preferred embodiment can be as illustrated in FIG. 7 and include utilizing a browser 50 to access initial scripts at a predetermined website. A standard login procedure is then provided 51 and a list of subjects presented. The user is prompted for the relevant domains to be searched and the search set for the subject are determined. The search is then executed which results in the PHP scripts for carrying out a web search being conducted 52. The results are then tabulated and presented 53, with the user provided with the option to save the search 54. The user is then able to link with the tabulated URL presented. Optionally, the user is able to print, email or save the results 55.

Compilation and Entry of Data into the Thesaucratic Database

In the prototype, the Thesaucratic database was initially manually compiled from the subject outlines, courseware, notes and the reading list from both e-reserve documents lodged in digital format on the University of Can berra Library web site as well as hard copies obtained from subject conveners.

All core concept terms, synonyms, contemporary terms or phrases related to the subject were entered directly into the thesaucratic database. The ontological structure has four classes of entry. In descending order they are: Primary Term (Term—T), Second Term (Near Term—NT), First Semantic Term (Broader [related] Term—BT) and Second Semantic Term (Related [related-lower level] Term—RT). Accordingly, this is similar to the Library of Congress classification structure as well as the commonly accepted procedure of thesaurus ontology structure. However, because of the individualized style of the thesaucratic database the use of International Standards was not strictly adhered to.

When core concepts were determined, although they are not necessarily single words and also consisted of phrases, they were entered in the Primary Term (Term—T), Second Term (Near Term—NT), First Semantic Term (Broader [related] Term—BT) and Second Semantic Term (Related [related-lower level] Term—RT). To provide a comprehensive thesaurus as possible, all core concepts and terms entered on the database were evaluated for additional terms in the Directory of Contemporary and Natural Language Search Terms for the Internet (2000), the Macquarie Thesaurus (2004) and the Oxford Thesaurus (2002).

The use of the Macquarie Thesaurus (2004) and the Oxford Thesaurus (2002) is to gain terms, synonyms and subsidiary terms that are used in Australia, the USA and the UK. The rationale is because language and idioms in Australia today are often a mixture of Australian, American and English and this is important when information seeking on the www and internet as web pages are a mixture of differing terminologies. An additional reason is that synonyms change over time. For example, the airwave (also known as radio wave) receiver was invented and up to now it has been known and is still sometimes referred to as: wireless, radio, transistor radio, trannie and in some cultural circles it is known as a beat box, but this depends on the music being played and the culture of the owner. Therefore, the concept subject thesaurcratic database was best programmed not only with core concepts, terms and synonyms and their semantic affiliations, but also with idioms and language that are in common use and are a part of contemporary and natural language.

The sub elements within the first main element being the thesaucratic database are: firstly, the design uses the three dialects of English, being English, American and Australian dialects, secondly, terms from subject courseware, dictionaries and thesauri, internet dictionaries, and encyclopedias, thirdly, the design uses contemporary natural language, fourthly, the design uses colloquial language, fifthly, the database design encompasses sayings, dates, acronyms and terms that are in common use.

The reference materials 22 (FIG. 4) were separately provided as a help system for the use to access. The help system included teaching tools such as the inclusion of speech bubbles that tell the user what is happening or clarifying information such as 'did you know that this is a search term that can be used in other databases?' or other terms that provide information of an instructive nature. Secondly, is the provision of banners that provide information such as 'Advocacy and Inclusion' is another subject that has similar terms to Socio-cultural Politics' or other subjects that are included in the thesaucratic database. Thirdly is the 'pop ups' that explain the stages of information seeking and/or the factors that make up academically acceptable and authorative materials.

A further search script is provided. This search script can be divided into three sub elements which are: Firstly, the search tool searches the www and internet using the pre-programmed search terms in the database, the second is that the search facility is especially formulated to search by default on .edu, .org, .gov as well as providing other domains such as have been found on the www and internet by the researcher and included in a list of default search domains. The default search domains list may be added to at any stage by the data administrator. Secondly, the search tool allows the user to save searches in a separate folder created by the user. Thirdly, once the user has completed the search and selected a record to browse and the user saves it to their personal folder, a pop up, banner or list appears to the user asking the question whether or not 'this material' is authorative and may be used for academic referencing. Fourth, the search engine web interface, upon completion and saving or not saving the sourced materials will allow the user to save the bibliographic record.

The preferred embodiment of the core concept thesaucratic database provides the benefits of providing pre-programmed search terms for the user, providing alternative search terms based on the primary search terms, and provides a simple but effective search tool in a simple four step procedure. The results lead to concentrated searching and focused results, eliminates time waste and downloads and provides a research tool that can be programmed for any subject or environment.

Graphical user interface (GUI) and ease of use is evidenced by the simplicity of the web interface. The design has been based on research conducted on humans and the use of graphical user interfaces and how they interact with each other which therefore provides a simple design to accommodate user intuitiveness.

As a refinement of the preferred embodiments, filters can be put into place to limit the database to only access education, organizations or government web sites as well as providing the user with an opportunity to use additional filters such as .net etc. Additionally, because the database and web design is automatically (by occlusion) excluding commercial web sites such as .com etc then this also makes the database and web interface more 'family friendly' and non-offensive to children and the average user.

Upgrading of content is preferably performed at regular intervals by the data administrator as new subjects, terms, web sites and additional facilities are included on the database website and webpage interface.

The thesaucratic database has specifically been built by using subject concepts which are based on the dialects within a basic language for example: Australian-English, American-English and English-English. The database is connected to a search engine which in turn searches the internet for information related to the user selected search term, the database only searches on pre-determined entities such as .edu, .gov, .org as determined by the data administrator. The database teaches and aids the user in information seeking skills and techniques as well as the requirements for academic standard for academically correct materials.

Database Overview

The database is subsumed on a computer and the data is available to all users who have been provided with authorized access. The database is connected to a website The database is programmed with a four category semantic relations. Within the four category relations there are sub-related terms. The terms within the database are able to be used to search the internet using the terms in the database. For a simple search on the internet, the user is able to search on 1 category term, 1 and 2 category terms, 1 and 3 category terms or all terms in 1 category. Each category may consist of any number of terms. The user may also construct their own term for inclusion in the search. The user may also be permitted to save their own term for current or future searches. Any term may consist of dates, personal names, proper names, verbs, adverbs, acronyms, events, idioms, artifacts, places, sociological themes such as cultural or political ideologies etc. The initial terms in the database can be derived from subject courseware, reading lists, dictionaries and thesauri, The terms are in contemporary natural language in the English language in the dialects of Australian-English, American-English and English-English. The user may access the program using a search engine. The user may save their results. The user may construct a personal folder. The user is given separate instruction in information seeking skills and techniques. The user is given instruction in bibliographic referencing. The user will be able to alter the domains of their search. The user will be able to search in specific world geographic areas. The user will be able to personalize the web page. The user will be able to save their personalized settings. The user will be able to use the web interface to search for any term they create. The user will be able to turn off or on the settings for teaching information seeking. The user will be able to turn off or on the settings for bibliographic referencing. The user will be able to turn off or on the character currently named 'Zat' who leads the information seeking and referencing. The database regularly performs 'spidering' or 'crawling' for updated web pages. The data tables are able to have data updated by the data administrator. The thesaucratic database, web interface and search facility are in the prototype form and as such is fully able to be transformed to suit any subject, language or situation in any form.

The forgoing describes preferred forms of the present invention. Modifications, obvious to those skilled in the art can be made thereto without departing from the scope of the invention.

The claims defining the invention are as follows:

1. A method of providing enhanced on-line computer searching capabilities, the method comprising the steps of:
    (a) forming a thesaurus database including first core concept terms and a series of secondary related terms, related to said core concept terms;
    (b) providing a user interface to said database for selection of first core concept terms by a user;
    (c) instructing said user on various methods of information seeking through a teaching tool comprising at least three subcomponents, said at least three subcomponents being speech bubbles that tells said user what is happening or clarifying information, banners that provide information of other subjects that are included in said thesaurus database, and 'pop-ups' that explain stages of information seeking and factors that make up academically acceptable and authoritative material;
    (d) providing said user an interactive subject selection screen comprising a list of subjects from which user selects at least one subject;
    (e) connecting a subject data screen to said subject selection screen, said subject data screen allows said user to commence an internet search;
    (f) upon selection of a core concept term by a user, carrying out a search for information relating to the core concept terms and of the secondary related terms;
    (g) providing the user with the results of said search and
    (h) providing a script including sub elements comprising:
        saving said search in a separate folder created by said user;
        selecting a record from said list;
        saving said record in a personal folder; and
        determining if said record was saved, and if said record was saved, providing to said user the option of identifying if said record is authoritative and if said record is usable for academic referencing.

2. The method according to claim 1, wherein said step (f) involves searching over the internet and said search is carried out for a predetermined subset of web domains selected by said user.

3. The method according to claim 2, wherein said first core concept and secondary related terms include single or multiple words.

4. The method according to claim 3, wherein said thesaurus database includes entries for different English dialects.

5. The method according to claim 4, wherein said dialects include English-English, American-English and Australian-English dialects.

6. The method according to claim 4, wherein said dialects include colloquialisms of English-English, American-English and Australian-English dialects.

7. The method according to claim 4, wherein said dialects include idioms of English-English, American-English and Australian-English dialects.

8. The method according to claim 1, wherein said thesaurus database includes acronyms of any language including English-English, American-English and Australian-English dialects.

9. The method according to claim 1, wherein said thesaurus database includes well known sayings of any language including English-English, American-English and Australian-English dialects.

10. The method according to claim 2, wherein said domains are limited by filters which limit the access of said database to the domains of education (.edu), government (.gov) and organizations (.org).

11. The method according to claim 1, wherein said search is carried out on the internet.

12. The method according to claim 1 further comprising the step of providing the user with Bibliographic records or references to research materials associated with specific terms searched.

13. The method according to claim 2, wherein said search is carried out over domains in specific world geographic areas.

14. The method according to claim 1, wherein said thesaurus database comprises at least four subcomponents, said subcomponents includes said first core concept terms, a second related terms, a third related terms and a fourth related terms, said second, third and fourth related terms being linked to and searched in descending order of distance from said first core concept terms, and wherein said third related terms are primary semantic terms, and said fourth related terms are secondary semantic terms.

15. A method of providing enhanced on-line computer searching capabilities, the method comprising the steps of:
   (a) providing a database for storing search terms and synonym sets;
   (b) storing said search terms, synonym sets, and sub-components of said search terms and synonym sets in said database so to minimize repetition of data;
   (c) providing scripts to access and manipulate said database, said scripts being adapted to support a Object-Oriented Programming (OOP) paradigm, said scripts utilizes said OOP to represent and access said search terms, synonym sets, and said sub-components;
   (d) providing a user interface adapted to accept a user's input data;
   (e) instructing said user on various methods of information seeking through a teaching tool comprising at least three subcomponents, said at least three subcomponents being speech bubbles that tells said user what is happening or clarifying information, banners that provide information of other subjects that are included in said thesaurus database, and 'pop-ups' that explain states of information seeking and factors that make up academically acceptable and authorative material;
   (f) providing said user an interactive subject selection screen comprising a list of subjects from which said user selects at least one subject;
   (g) connecting a subject data screen to said subject selection screen, said subject data screen allows said user to commence an internet search;
   (h) entering said input data into said user interface, said input data being said search terms;
   (i) passing said input data to said scripts which interacts with said database to create said synonym sets related to said search terms;
   (j) breaking down said synonym sets into individual search terms and giving each individual search term a unique identification number;
   (k) using said identification number to link said individual search terms into sets of words with similar meanings;
   (l) linking said sets of words to create said synonym sets;
   (m) presenting to a user through said user interface said search term and said synonym sets related to said search terms;
   (n) offering said user the option of conducting a search using any of said search terms and said synonym sets;
   (o) determining if any of said search terms and said synonym sets were selected;
   (p) carrying out a search for information relating to the selected said search terms and said synonym sets over the internet and said search is carried out for a predetermined subset of web domains selected by said user;
   (q) providing said user with the results of said search; and
   (r) providing a further script including sub elements comprising:
      saving said search in a separate folder created by said user;
      selecting a record from said list;
      saving said record in a personal folder; and
      determining if said record was saved, and if said record was saved, providing to said user the option of identifying if said record is authoritative and if said record is usable for academic referencing.

16. The method according to claim 15, wherein said database is a thesaurus database including entries for different English dialects, said dialects include English-English dialects, American-English dialects, Australian-English dialects, colloquialisms of English-English, American-English and Australian-English dialect, and idioms of English-English, American-English and Australian-English dialects.

17. The method according to claim 15, wherein said script for each of said search terms, synonym sets, and said sub-components is written and stored separately for allowing addition or modification of new information and functions without affecting existing operation.

18. The method according to claim 15, wherein a portion of said script that accesses said database is an independent module allowing for upgrades to be made within said module, thereby leaving reaming portions of said script unaffected.

* * * * *